United States Patent

[11] 3,588,820

[72] Inventors Richard O. Cobb;
James Lipp, Poughkeepsie, N.Y.
[21] Appl. No. 791,320
[22] Filed Jan. 15, 1969
[45] Patented June 28, 1971
[73] Assignee International Business Machine Corporation
Armonk, N.Y.

[54] CHARACTER CHECKING APPARATUS FOR OPTICAL CHARACTER GENERATOR
6 Claims, 4 Drawing Figs.

[52] U.S. Cl. .......... 340/146.1, 250/219, 346/107, 355/41
[51] Int. Cl. .......... G03b 43/00, G06k 5/04, G11b 27/36
[50] Field of Search .......... 340/146.1; 179/100.3 (P); 250/215, 219, 220; 346/107; 355/41; 356/71, 124

[56] References Cited
UNITED STATES PATENTS
RE26,170 3/1967 Harris .......... 346/107
3,372,383 3/1968 Konen et al .......... 250/219(I)
OTHER REFERENCES
King, G. W. Recording Information by Laser, In Discovery. 27(1): p 19— 22. January, 1966. Q1D5

*Primary Examiner*—Malcolm A. Morrison
*Assistant Examiner*—R. Stephen Dildine, Jr.
*Attorney*—Hanifin and Jancin and William S. Robertson

ABSTRACT: An optical character generator is improved by providing checking bits for the characters of the character mask. The checking bits are sensed on the output side of the character generator and are compared with a character address supplied to the character generator. A mismatch between the address of the selected character and the checking bits sensed at the character generator output signifies a failure in the character generator or the associated apparatus.

INVENTORS
RICHARD O. COBB
JAMES LIPP
BY W. J. Robertson
ATTORNEY

CHARACTER CHECKING APPARATUS FOR OPTICAL CHARACTER GENERATOR

BACKGROUND OF THE INVENTION

An object of this invention is to provide a new and improved character checking apparatus for an optical character generator. Although various optical character generators are well known, a description of a particular generator will be a helpful introduction to the terminology and the objects and features of this invention. The optical character generator that will be described later includes a character mask, a light source, and a digital light deflector that deflects the light from its original axis to a portion of the mask holding a selected character. A second light deflector returns the beam to its original axis at the output side of the character generator. Light at the output side of the character generator can be used to form an image of the character. For example, U.S. Pat. RE 26,170 discloses an optical printer that uses such a combination of a mask and a light deflector. A character may be ordinary letters, numbers and punctuation marks and it may also be various geometric shapes.

A light deflector may comprise a treelike array of deflector stages that individually respond to a binary valued electrical input to transmit incoming light along its incident path or to deflect the light to a parallel path that is spaced from the incident path a predetermined distance. Each light deflector stage includes a birefringent crystal that has two different indexes of a refraction to light of different polarization. Thus, light of a first polarization is deflected from its incident path and light of a second polarization may be transmitted along its incident path. A light deflector stage also includes an electro-optic crystal that responds to an input voltage to rotate the plane of polarization of the incident light to the appropriate plane for the selected path. Thus, a character of the mask is defined by coordinants on the mask and binary logic inputs to the individual deflection stages direct the beam to the selected character. Such an input will be called a character address signal.

Particularly in an automated process such an optical printing, there is a need for means to check in real time the character generator and associated apparatus and to provide a signal if the system fails to provide the selected character. An object of this invention is to provide a new checking apparatus that provides a signal whenever the character generator fails.

THE INVENTION

This invention provides means for deflecting a small portion of the light at a suitable point between the character generator mask and the subject that is to be illuminated with the character. A specific embodiment of the invention, the checking apparatus includes a beam splitter than transmits substantially all of the image of the character to the subject and deflects a small portion to monitoring apparatus. The deflected light is sensed to produce a signal that identifies the transmitted character. This output is compared with the character address input to the light deflector to produce a signal signifying whether the selected character has been transmitted from the character generator.

Preferably the character generating mask includes additional regions that define the characters in a binary code. In one embodiment each character of the mask is encircled by a region in which light transmitting or opaque spots in predetermined positions form binary checking bits identifying the character. Both the character and the checking bits are transmitted through subsequent optical components of the system to the checking apparatus and the checking bits are compared with the character address. In a second embodiment of the invention the characters and the related checking bits are located in at corresponding positions of separate regions of the mask and the light deflector is arranged to transmit a light of one frequency through the selected character and to transmit a light of a second frequency through the corresponding checking bit pattern. In this embodiment of the invention the two frequencies are separated by a dichroic mirror.

This invention also provides means for checking the output of a deflector used in an optical printer for positioning the character on the recording medium. Means is provided for sensing the position of the beam and for comparing the sensed position with a position address signal controlling the digital light deflector that causes the characters to scan the recording medium.

The following description of two specific embodiments of the invention will suggest other features and objects of the invention and various applications for the invention.

THE DRAWING

THE EMBODIMENT OF FIGS. 1 AND 2

Figure 1:
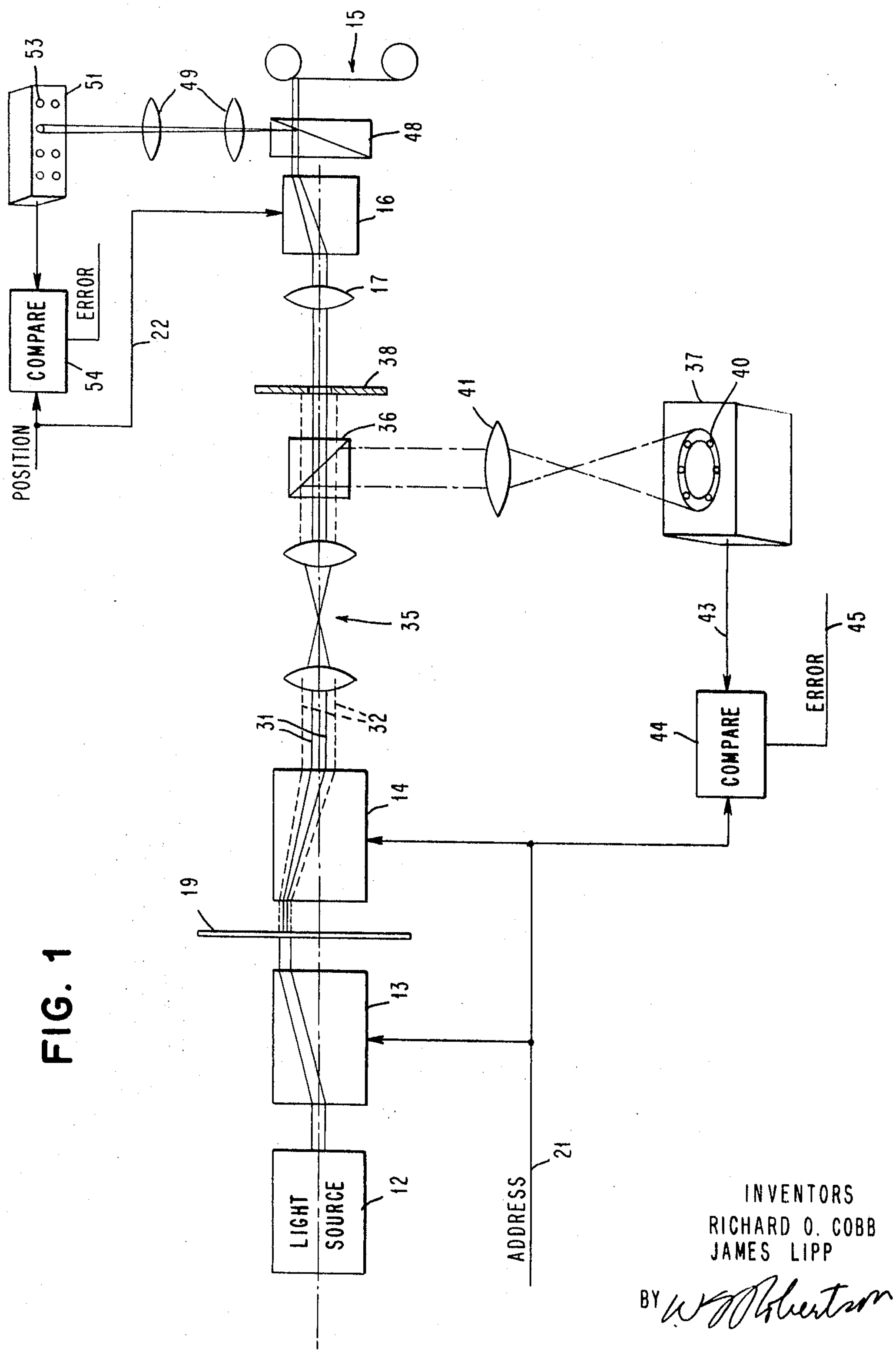
FIG. 1 is a schematic diagram of one embodiment of this invention adapted to check a well-known optical printer.

The Optical System of FIG. 1

FIG. 1 shows one embodiment of the invention adapted to check a well-known optical printer. The printer includes a light source 12, a first digital light deflector 13 and a second deflector 14 that are part of an optical character generator, a recording medium handling apparatus 15, a third deflector 16 for directing a character to a desired position on the recording medium, and a lens system 17 for focusing the character and for giving the character a selected size. The character generator includes a character mask 19 which contains characters and which according to this invention is provided with checking bits for the characters, as will be explained later. Each deflector 13 and 16 comprises a treelike array of deflector stages that respond to binary valued input signals to transmit light along one of two paths of a birefringent crystal, either along its incident path or deflected to a second parallel path spaced apart a predetermined distance from the first path. Conversely, a stage of deflector 14 receives light at either of two spaced-apart input lines and directs the light along a common output line. An electro-optic crystal for each stage responds to a binary address signal to rotate the plane of polarization of the light according to the selected path through the associated birefringent crystal.

The light deflectors 13 and 14 of the character generator receive the binary address signals on a line 21 to deflect the light from source 12 through the selected character and back to the line of the incident path at the output of the character generator. Light deflector 16 receives a binary signal on a line 22 that defines the position of the character on the recording medium.

Except for features of the character mask that will be explained next, the optical system that has been explained is well known and illustrates a wide variety of applications for the checking apparatus of this invention.

The Character Mask Code

Figure 2:
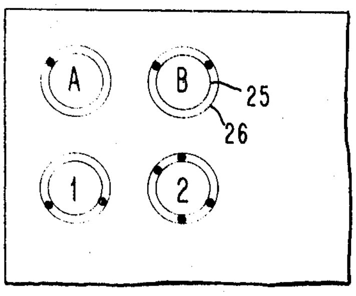
FIG. 2 illustrates the character and checking bits for the character mask of the system of FIG. 1.

FIG. 2 shows a portion of the character mask 19 with representative character A, B, 1 and 2. For most applications the characters, which are inked in the drawing, are transparent and the region around a character is opaque. A surrounding region indicated by construction lines 25 and 26 in the drawings has predetermined positions that are made opaque or transparent to represent the character in a binary code. In the example of FIG. 2, there are 6-bit positions for each character. From a more general standpoint, the mask in this embodiment of the invention has the check bits located where the light beam that selects a character also selects the associated checking bits and does not select checking bits of any other character. Locating the checking bits around the entire periphery of the associated character simplifies some of the components of the checking apparatus that will be described later, but the checking bits may be grouped in other suitable patterns.

Any suitable coding arrangement may be used. Preferably the coding for each character is unique and preferably the coding is related to the coding of the character address on line 21 so that the checking bits of the character can be compared directly with the address bits.

The Checking Apparatus of FIG. 1

In FIG. 1 the two solid lines 31 represent the portion of the beam containing the selected character and the dashed lines 32 show the surrounding region of the beam which contains the checking bits. The beam diverges after passing through the character mask and a telescope lens system 35 is arranged to collimate the beam. A beam splitter 36 is arranged to transmit most of the light to the subject to be illuminated 15 and to reflect a small portion of the light to a light sensing device 37. Preferably, about 90 percent of the light is transmitted to the subject and 10 percent is transmitted to the light sensing device. Means 38 is arranged to provide an aperture for transmitting the character containing portion of the light beam to the subject and for removing the checking bits that are transmitted through the beam splitter.

The light sensing device 37 may be of any suitable type. Preferably it includes light sensitive semiconductor diodes 40 that are arranged in the pattern of the coding bits of FIG. 2. Suitable projection means 41 is provided for forming the image of the checking bits on the light sensitive elements of the light detector. The individual outputs of the light sensing elements are applied to an output 43. A compare circuit 44 receives the output 43 and the character address 21 and produces an output 45 which indicates an error. Compare circuit 44 comprises means for converting output 43 to the form of the character address if they are not similarly encoded and means forming the Exclusive OR logic function of corresponding bits of the address and the character code. Output 45 can be used to signal personnel operating the subject 15, to stop the subject, or to begin an operation to diagnose and correct the failure.

FIG. 1 also shows apparatus for checking the position of the digital light deflector 16. A beam splitter 48 is arranged to transmit about 90 percent of the light output of deflector 16 to the subject 15 and to reflect about 10 percent through a lens system 49 to a light sensitive device 51. Device 51 has light sensitive elements 53 arrayed in the pattern in which light appears at the output of deflector 16 and on the subject 15. When deflector 16 and the associated components are operating normally, a particular one of the light sensitive elements 53 is illuminated in response to a signal on line 22. A compare circuit 54 is arranged to receive an output 55 from light sensing device 51 and the position control signal 22 and to produce an output 55 signifying whether the output of deflector 16 agrees with signal 22. The logic output 55 can be used to signal personnel operating the subject 15, to stop the subject, or to begin an operation to diagnose and correct the error.

THE EMBODIMENT OF FIGS. 3 AND 4

Figure 4:
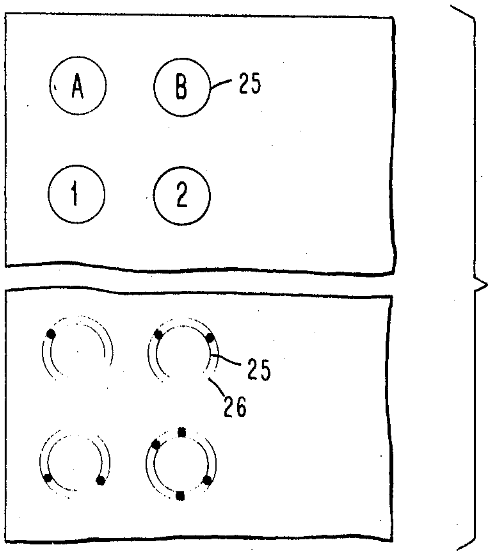
FIG. 4 illustrates the characters and checking bits of the character mask of the apparatus of FIG. 3.

The Mask of FIG. 4

The illustrative characters of FIG. 4 are identical to the characters of FIG. 2 and carry the same coding bits. However, in the mask of FIG. 4, the characters are arrayed in one portion of the mask and the code bits are arrayed in another portion of the mask. The coding bits are positioned with respect to the associated character such that the character and the associated checking bits are selected by the operation of a digital light deflector on two wavelengths of light in response to a single address signal, as will be explained next.

Figure 3:
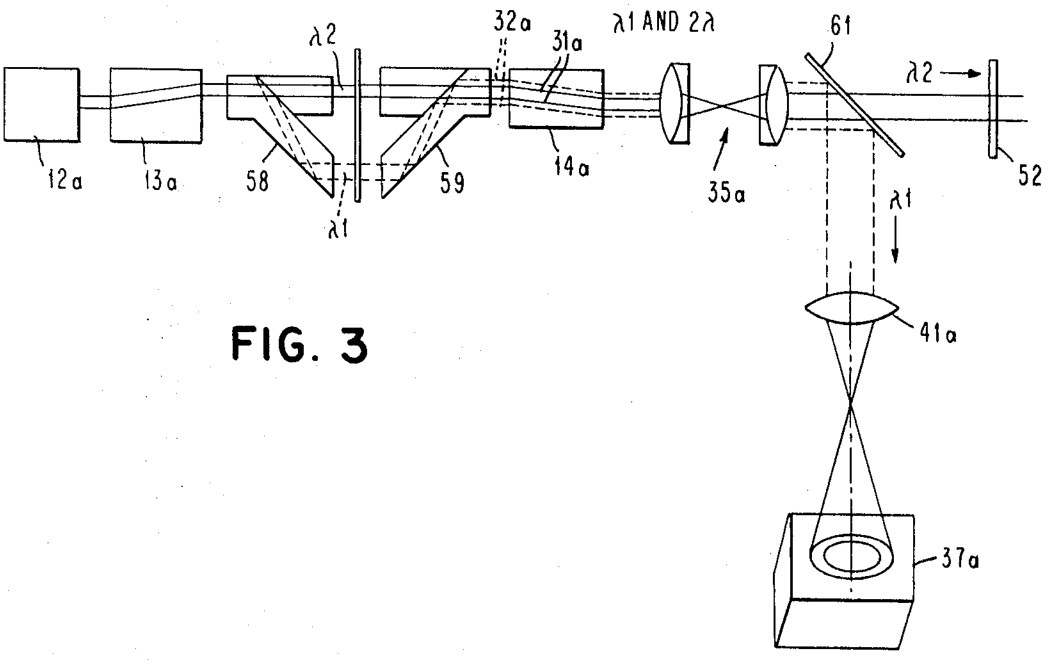
FIG. 3 is a schematic diagram of a second embodiment of the invention.

The Apparatus of FIG. 3

The apparatus of FIG. 3 includes a light source, a first deflector, a mask, a second deflector, a collimating system, a light sensing device, and an associated lens system that are counterparts of these components in FIG. 1 and are identified by the same reference characters with the subscript *a* in the drawing. The light source 12*a* is arranged to provide two wavelengths that are close enough to pass through a total internal reflection system (described later) without significant dispersion. About 200 Angstroms difference in wavelength is satisfactory. Various suitable light sources are well known. For example, the source may comprise a laser that produces a large number of wavelengths from which two are selected by means of filters. Source 12*a* may also comprise a low power, low cost auxiliary laser supplying the wavelength for reading the checking bits and a laser of suitable power for reading the characters.

Light from source 12*a* is deflected to the position of deflected character by means of the first digital light deflector 13*a*. Means 58 is positioned between light deflector 13*a* and the mask to transmit one wavelength to the character portion of the mask and to transmit the other wavelength to the checking bit portion of the mask. Means 58 preferably comprises a total internal reflection deflection system which transmits the two wavelengths along the paths shown. A similar deflection system 59 combines the two wavelengths with the checking bits occupying the region about the character in the relationship provided by the apparatus of FIG. 1 as lines 31*a* and 32*a* show. Light deflector 14*a* returns the beam to a central axis. The telescope system of FIG. 3 is similar to the telescope system of FIG. 1 except that it is arranged for collimating the light of two wavelengths.

The two portions of the beam are separated by means of a dichroic beam splitter 61 which transmits wavelength $\lambda 2$ to the subject to be illuminated (not shown) and reflects wavelength $\lambda 1$ to the light sensing apparatus 37*a*. Preferably, a filter 52 is positioned between beam splitter 61 and the subject to remove any of the residual light of wavelength 1.

Light sensing device 37*a* produces an output that is compared with a character address signal to produce an error signal if the addressed character is not selected. These components are shown only in FIG. 1.

From the embodiments of the invention that have been discussed, those skilled in the art will recognize various modifications and additional application within the spirit of the invention and the scope of the claims.

We claim:

1. An optical character generating system comprising a mask adapted to form optical characters in a light beam transmitted through selected positions on the mask, means providing a character address signal defining a character to be selected in the mask, and means directing the beam from the mask to a subject to be illuminated, wherein the improvement comprises:

checking bit generating means for each character located in said mask to be selected with the beam selecting the associated character;

beam splitting means arranged in the path of light transmitted from said mask to said subject for separating a first beam containing said checking bits from a second beam containing said character;

means responsive to said checking bits in said first beam for producing an indication of the character formed by said mask; and means for comparing said indication and said character address to provide an output signifying an error in the optical system.

2. The system of claim 1 in which said means for producing an indication of the character formed by the mask comprises light sensitive elements arrayed to receive the checking bits in the beam.

3. The system of claim 1 wherein the mask comprises checking bit positions around the periphery of each character.

4. The system of claim 3 wherein said system further includes aperture means arranged to transmit the character portion of said beam and to prevent transmission of the checking bits to said subject.

5. The system of claim 1 wherein said light source provides two closely differing wavelengths and said character generating means comprises a light deflector transmitting one frequency through a character portion of the mask and the other frequency through a checking bit portion of the mask, and said means for separating the checking bits from the associated character comprises a dichroic beam splitter.

6. The system of claim 1 further including a digital light deflector responsive to a position control signal to direct the beam to a selected position on said subject and, means located to receive a portion of the light transmitted from said deflector to said subject for producing an indication of the position of said character, and means for comparing said position indication and said position control signal to provide an additional output signifying an error in the optical system.